(12) United States Patent
Chang (10) Patent No.: US 8,480,039 B2
(45) Date of Patent: Jul. 9, 2013

(54) BRACKET OF ELECTRONIC DEVICE

(75) Inventor: Tzung-Wei Chang, Taipei County (TW)

(73) Assignee: Wistron Corp., Hsichih, Taipei County (TW)

( * ) Notice: Subject to any disclaimer, the term of this patent is extended or adjusted under 35 U.S.C. 154(b) by 259 days.

(21) Appl. No.: 12/890,433

(22) Filed: Sep. 24, 2010

(65) Prior Publication Data

US 2011/0073734 A1    Mar. 31, 2011

(30) Foreign Application Priority Data

Sep. 30, 2009  (TW) .............................. 98133130 A (51) Int. Cl.
  *G12B 9/00* (2006.01)
  *G06F 1/16* (2006.01)
  *H05K 5/00* (2006.01)

(52) U.S. Cl.
  USPC ...... 248/27.1; 248/674; 248/682; 361/679.33

(58) Field of Classification Search
  USPC ................ 248/632, 634, 635, 539, 633, 27.1, 248/618, 675, 683, 309.1; 361/685, 679.33, 361/679.34, 679.35, 679.39, 679.36, 679.37, 361/681, 683; 312/223.1, 223.2
  See application file for complete search history.

(56) References Cited

U.S. PATENT DOCUMENTS

| | | | |
|---|---|---|---|
| 5,483,419 A * | 1/1996 | Kaczeus et al. | 361/679.39 |
| 6,683,785 B1 * | 1/2004 | Chen | 361/679.33 |
| 6,798,650 B2 * | 9/2004 | Reznikov et al. | 361/679.33 |
| 7,639,490 B2 * | 12/2009 | Qin et al. | 361/679.34 |
| 7,729,110 B2 * | 6/2010 | Zhang et al. | 361/679.33 |
| 7,903,401 B2 * | 3/2011 | Lee et al. | 361/679.33 |
| 8,004,830 B2 * | 8/2011 | Lu | 361/679.33 |
| 8,094,446 B2 * | 1/2012 | Liu | 361/679.33 |
| 8,235,225 B2 * | 8/2012 | Ye | 211/41.12 |
| 2005/0116135 A1 | 6/2005 | Peng et al. | |
| 2006/0023416 A1 * | 2/2006 | Chen | 361/685 |

FOREIGN PATENT DOCUMENTS

| | | |
|---|---|---|
| CN | 2692803 | 4/2005 |
| CN | 2886750 | 4/2007 |
| TW | I292088 | 1/2008 |

* cited by examiner

*Primary Examiner* — Tan Le
(74) *Attorney, Agent, or Firm* — Muncy, Geissler, Olds & Lowe, PLLC (57) ABSTRACT

A bracket is provided for fixing an electronic device therein. The bracket includes a main frame and a fixing member. The main frame has a connecting portion and two sideboards. The two sideboards are disposed to two ends of the connecting portion respectively and the two sideboards are disposed in parallel. A distance is kept between the two sideboards to accommodate the electronic device therein, and one of the two sideboards has a plurality of assembling holes. The fixing member is detachably mounted to the sideboard having the assembling holes. A plurality of connecting members are disposed to one side of the fixing member, for passing through the assembling holes respectively and being fixed on the electronic device, so as to fix the electronic device between the two sideboards.

16 Claims, 11 Drawing Sheets

BRACKET OF ELECTRONIC DEVICE

CROSS-REFERENCES TO RELATED APPLICATIONS

This non-provisional application claims priority under 35 U.S.C. §119(a) on Patent Application No. 98133130 filed in Taiwan, R.O.C. on 2009, Sep. 30, the entire contents of which are hereby incorporated by reference.

BACKGROUND OF THE INVENTION

1. Technical Field

The present invention relates to an electronic device bracket, and more particularly to an electronic device bracket for a quickly detaching electronic device.

2. Related Art

With the rapid progress of science and technology, a computer has become an indispensable article in a typical modern home. Whether for work or entertainment purposes, the computer is more and more frequently used, and a capacity of the hard disk device for storing data has also become increasingly large to satisfy increased working demands.

Currently, a hard disk installed in a commercially available computer is fixed to a bracket and then installed in a case of the computer with the bracket. In this instance, considering commercially available brackets, the hard disk is fixed to the bracket only by means of screws or other fastening tools. After being fixed by means of screws, the hard disk is then installed in the computer case through the bracket. However, the assembly process of such a hard disk is quite onerous, as not only are other tools needed for disassembly, but the assembly process is also time and energy consuming, causing considerable inconvenience.

Moreover, the hard disk itself has a vulnerable internal structure. When the data is accessed, data loss may occur due to reasons such as vibration. If the hard disk is struck carelessly during the assembly process, the internal components of the hard disk may be easily abraded, which may result in bad tracks and further cause loss of the stored data. Therefore, making the assembly and disassembly of a hard disk faster and more convenient has become an issue urgently requiring improvement by the inventor of the present invention and persons skilled in the art.

SUMMARY

An assembly process of a hard disk in a computer is rather complicated, and other tools are needed for assembly, disassembly, and usage of the hard disk.

In view of the above problems, the present invention is directed to an electronic device bracket which has a simple structure and is easily operated.

In order to achieve the above objectives, the present invention provides a bracket for fixing an electronic device, which is applicable to the fast assembly or disassembly of an electronic device. The electronic device bracket includes a main frame and a fixing member. The main frame has a connecting portion and two sideboards. The two sideboards are respectively disposed at two ends of the connecting portion and in parallel with each other. A distance is kept between the two sideboards for accommodating the electronic device between the two sideboards. One of the two sideboards has a plurality of assembling holes. The fixing member is detachably mounted to the sideboard having the assembling holes. A plurality of connecting members are disposed at one side of the fixing member, for passing through the assembling holes and being fixed on the electronic device between the two sideboards. The present invention further provides another electronic device bracket, applicable to fast assemble or disassemble an electronic device. The electronic device bracket includes a main frame and a fixing member. The main frame has a connecting portion and a sideboard. The sideboard is disposed at one end of the connecting portion. The fixing member is pivoted to the other end of the connecting portion. A plurality of connecting members is disposed at one side of the fixing member for fixing the electronic device between the sideboard and the fixing member.

The present invention further provides another electronic device bracket, applicable to fast assemble or disassemble an electronic device. The electronic device bracket includes a connecting portion and two fixing members. The two fixing members are pivotally disposed at two ends of the connecting portion respectively. A plurality of connecting members is disposed at one side of each fixing member for being fixed to the electronic device, thereby fixing the electronic device between the two fixing members.

The advantages of the present invention are that a user can easily fix the electronic device at the bracket by moving the fixing members, and can easily disassemble the electronic device by moving the fixing members so that they are separated from the electronic device.

DETAILED DESCRIPTION

Figure 1:
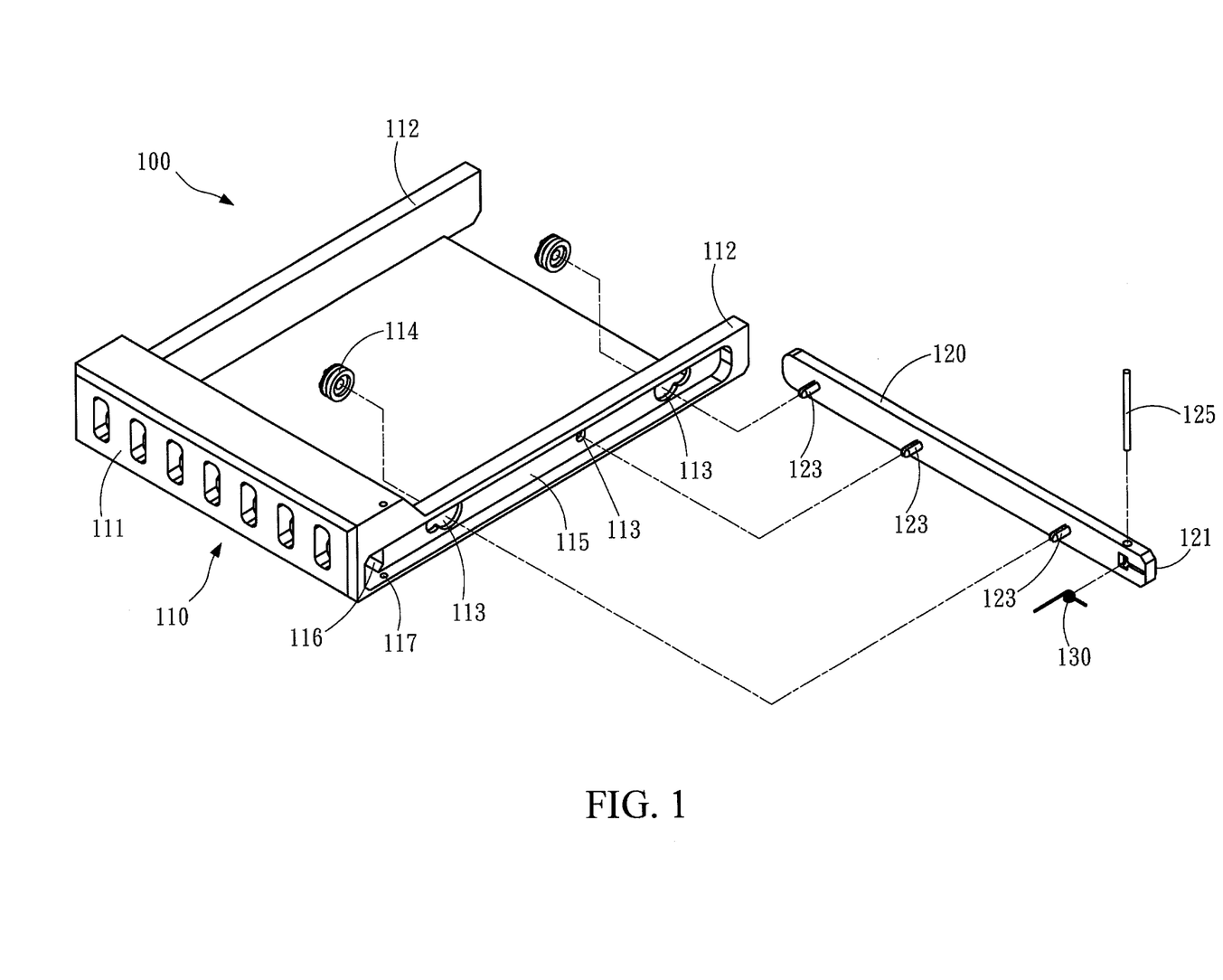
FIG. 1 is an exploded view of a first embodiment of the present invention.
Figure 2:
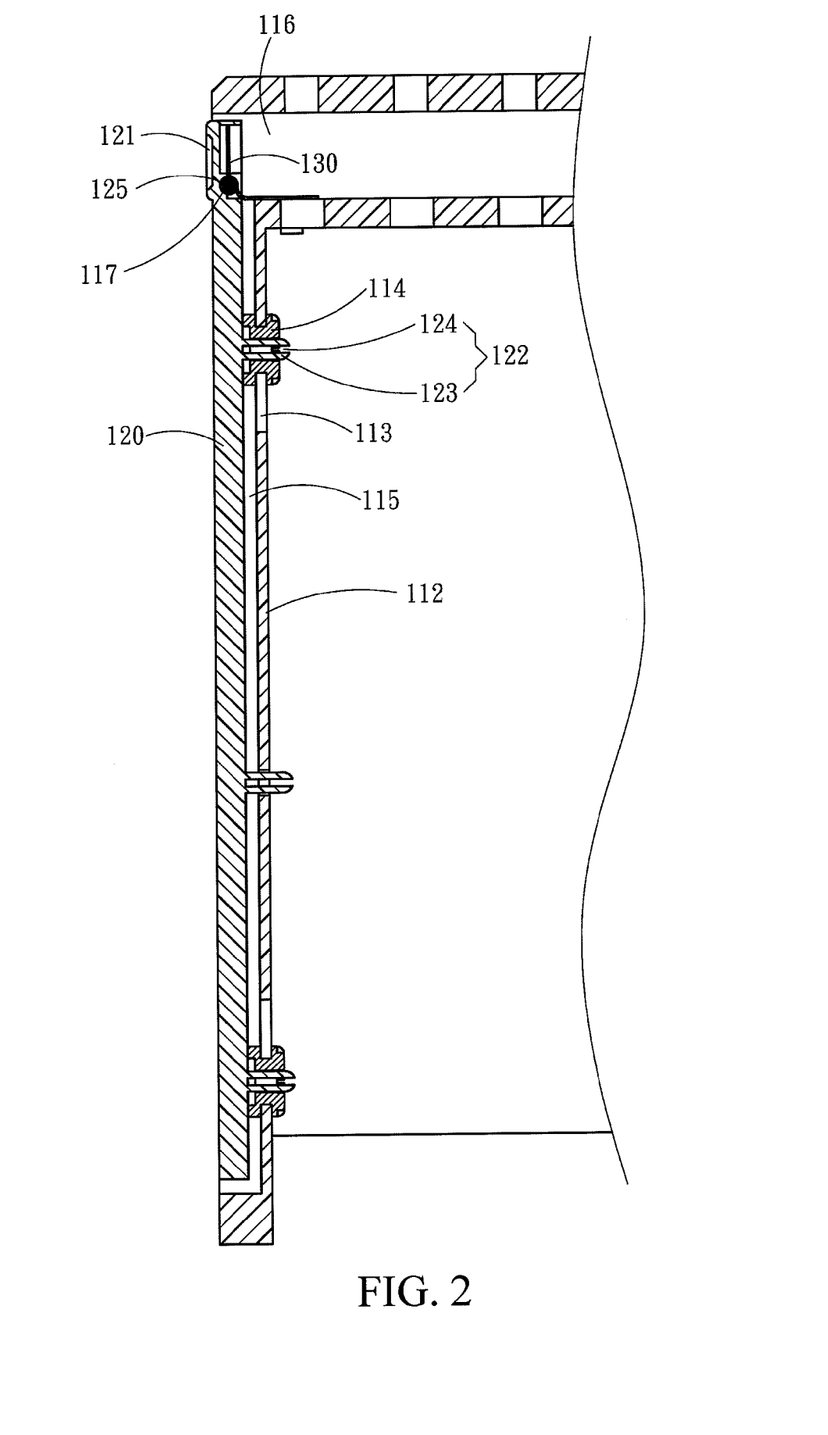
FIG. 2 is a cross-sectional view of the first embodiment of the present invention.

Referring to FIGS. 1 and 2, a bracket 100 for quickly assembling and dissembling an electronic device 900 according to a first embodiment of the present invention is used for fixing the electronic device 900 therein. The electronic device 900 may be, but is not limited to, a hard disk, floppy drive, or card reader. A hard disk is used as an example for the purpose of illustration in the present invention. The electronic device bracket 100 includes a main frame 110 and a fixing member 120.

Referring to FIG. 1, the main frame 110 has a connecting portion 111 and two sideboards 112. The two sideboards 112 are respectively disposed at two ends of the connecting portion 111 and in parallel with each other. A distance is kept between the two sideboards 112 for accommodating the electronic device 900 between the two sideboards 112. The main frame 110 may be made of an insulating material such as plastic. However, the present invention is not limited thereto. A rabbet 115 is formed at an outer side surface of one of the two sideboards 112. A sink area 116 is further formed at one end of the rabbet 115. The sideboard 112 has a plurality of assembling holes 113 arranged on the sideboard 112 at intervals and located on the rabbet 115. The number of the assembling holes 113 is preferably three, and relative positions among the assembling holes 113 match relative positions of screw holes at side surfaces of the hard disk. However, in the embodiment of the present invention the electronic device 900 is not limited to the hard disk, such that the relative positions of the assembling holes 113 may be configured in another manner. In addition, the electronic device bracket 100 further includes a plurality of elastic rings 114 inserted in the sideboard 112 and surrounding the assembling holes 113, so as to provide vibration buffering effects. The elastic rings 114 have an H-shaped sectional structure along a radial direction. A part of each elastic ring 114 is located within the assembling hole 113 and surrounds the assembling hole 113, and the remaining part is located at two sides of the sideboard 112 respectively. The elastic rings 114 are additionally disposed, which is only a preferred implementation and the bracket 100 of the present invention is not limited thereto. In other embodiments the elastic rings 114 may be omitted.

Referring to FIGS. 1 and 2, in which the fixing member 120 has an approximately flat strip-shaped structure and is detachably mounted to the sideboard 112 of the main frame 110. The fixing member 120 is stacked on the sideboard 112 in parallel. One end of the fixing member 120 has a pressing end 121. A plurality of connecting members 122 is disposed at one side of the fixing member 120 and corresponds to the assembling holes 113 on the sideboard 112. Each connecting member 122 includes two semicircular column bodies 123. However, the column bodies 123 are not limited to column bodies. A gap 124 exists between the two column bodies 123. When the fixing member 120 is stacked on the sideboard 112 in parallel, the fixing member 120 is stacked in the rabbet 115 to have the connecting members 122 pass through the corresponding assembling holes 113 respectively. The two column bodies 123 and the gap 124 enable each connecting member 122 to be compressed and deformed, thereby enhancing an effect of fixing the connecting members 122 to the electronic device 900. In one or more alternative embodiments of the present invention, the connecting member 122 may also be a single column, for example, a cylinder, which is directly fixed to the electronic device 900.

Figure 3:
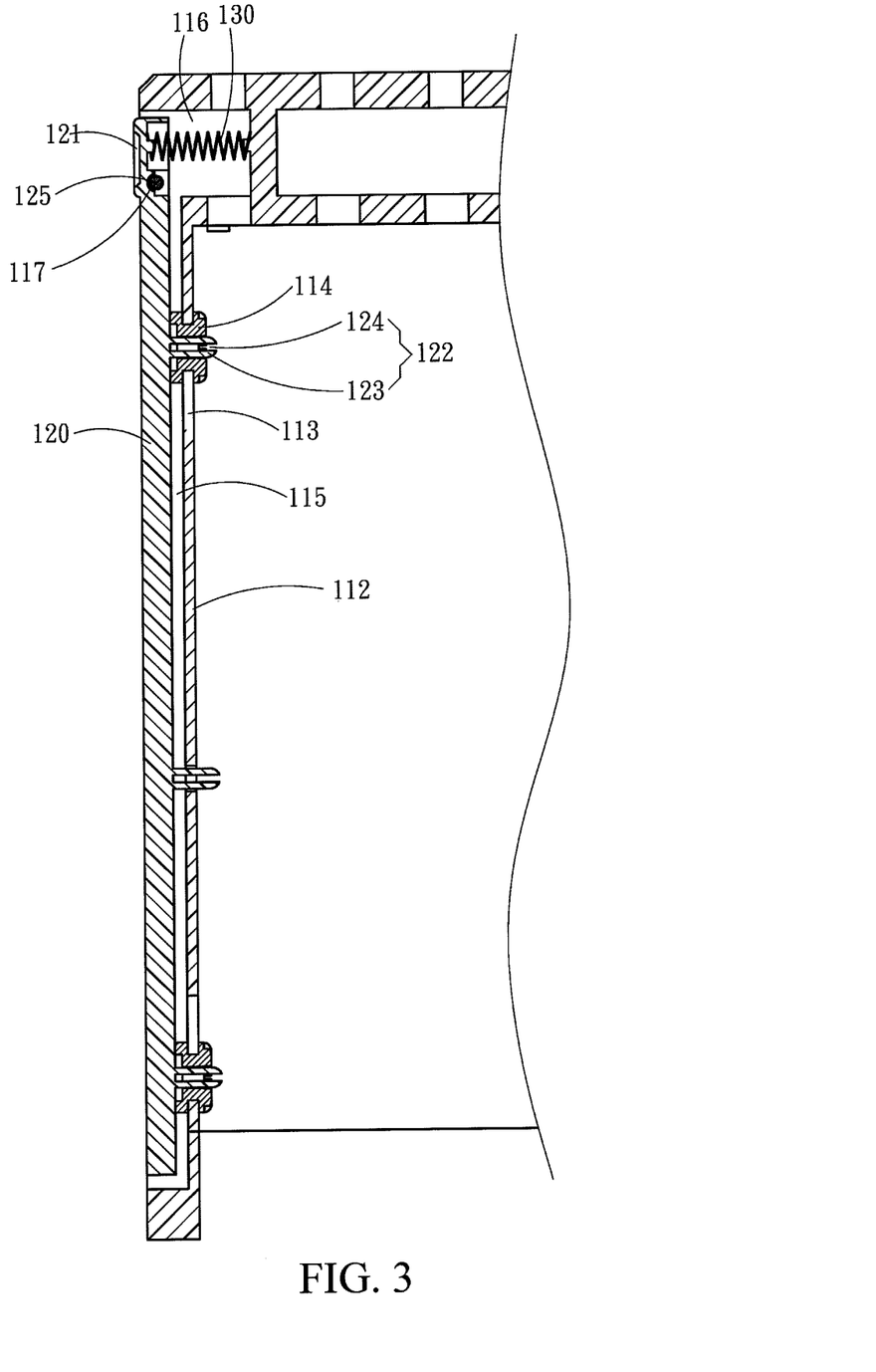
FIG. 3 is a cross-sectional view of a varied example of an elastic element according to the first embodiment of the present invention, showing a variation of the elastic element.

Referring to FIGS. 2 and 3, a front edge portion of the fixing member 120 is pivoted to the sideboard 112 of the main frame 110. A shaft 125 is disposed at the front edge portion of the fixing member 120, and the sideboard 112 has a pivot hole 117 located in the rabbet 115 and corresponding to the shaft 125. The shaft 125 is inserted into the pivot hole 117, such that the fixing member 120 is pivoted to the sideboard 112 of the main frame 110. When the fixing member 120 is pivoted to the sideboard 112, the pressing end 121 of the fixing member 120 is stacked on the sink area 116, and the pressing end 121 may further enter the sink area 116 with the rotation of the fixing member 120.

Referring to FIGS. 2 and 3, in which the electronic device bracket 100 further includes an elastic element 130. One end of the elastic element 130 is connected to the fixing member 120 and the other end is connected to the sideboard 112 to generate an elastic force to have the fixing member 120 be stacked on the sideboard 112. The elastic element 130 may be a torsion spring or a compression spring. When the elastic element 130 is a torsion spring, the torsion spring is sleeved on the shaft 125 and two ends of the torsion spring are connected to the fixing member 120 and the sideboard 112 respectively. When the elastic element 130 is a compression spring, the compression spring is disposed in the sink area 116 and two ends of the compression spring are connected to the pressing end 121 of the fixing member 120 and the sideboard 112 respectively. The compression spring is normally compressed; an elastic force is generated to push the pressing end 121 outwardly, such that the fixing member 120 is stacked on the sideboard 112.

Figure 4A:
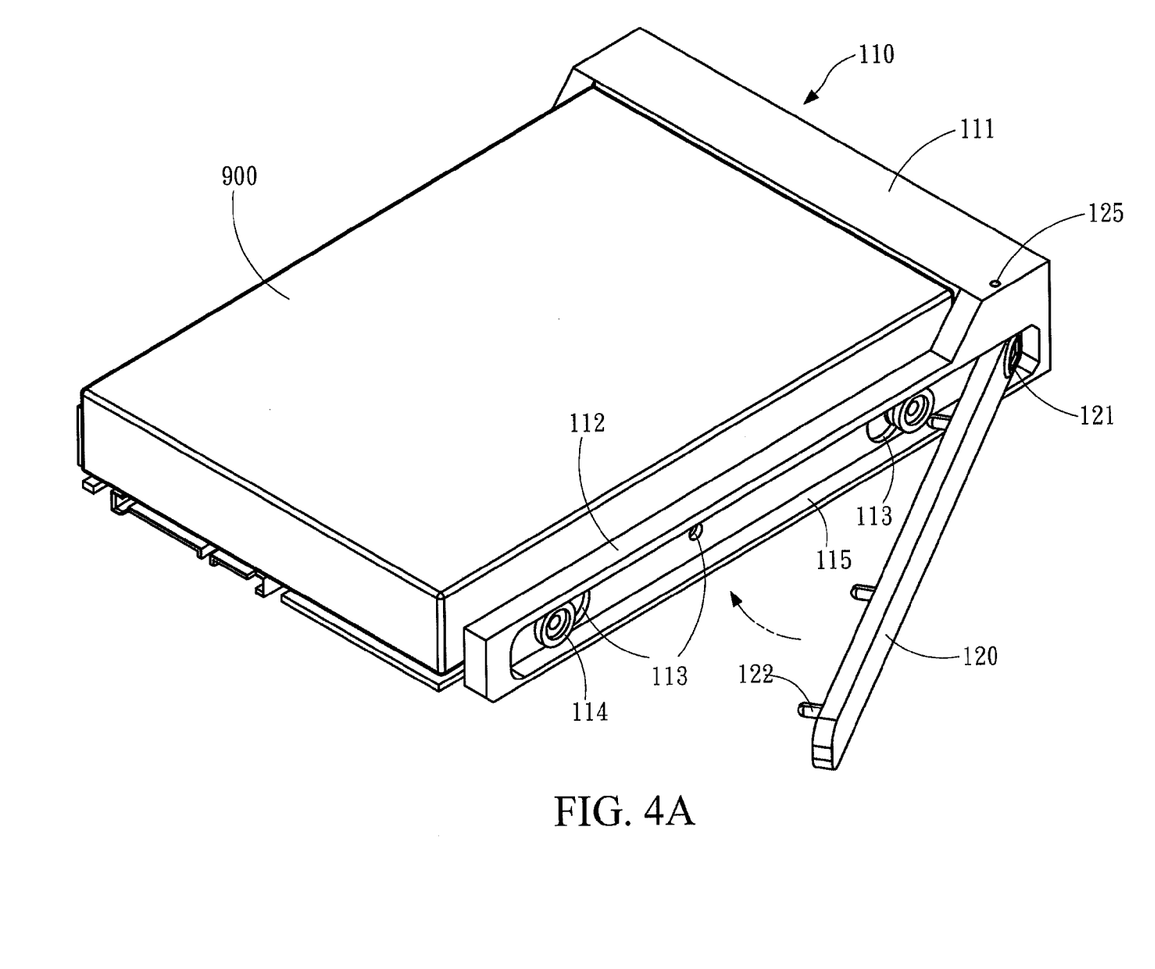
FIG. 4A is a perspective view of the first embodiment of the present invention, in which a fixing member and a sideboard are separated.
Figure 4B:
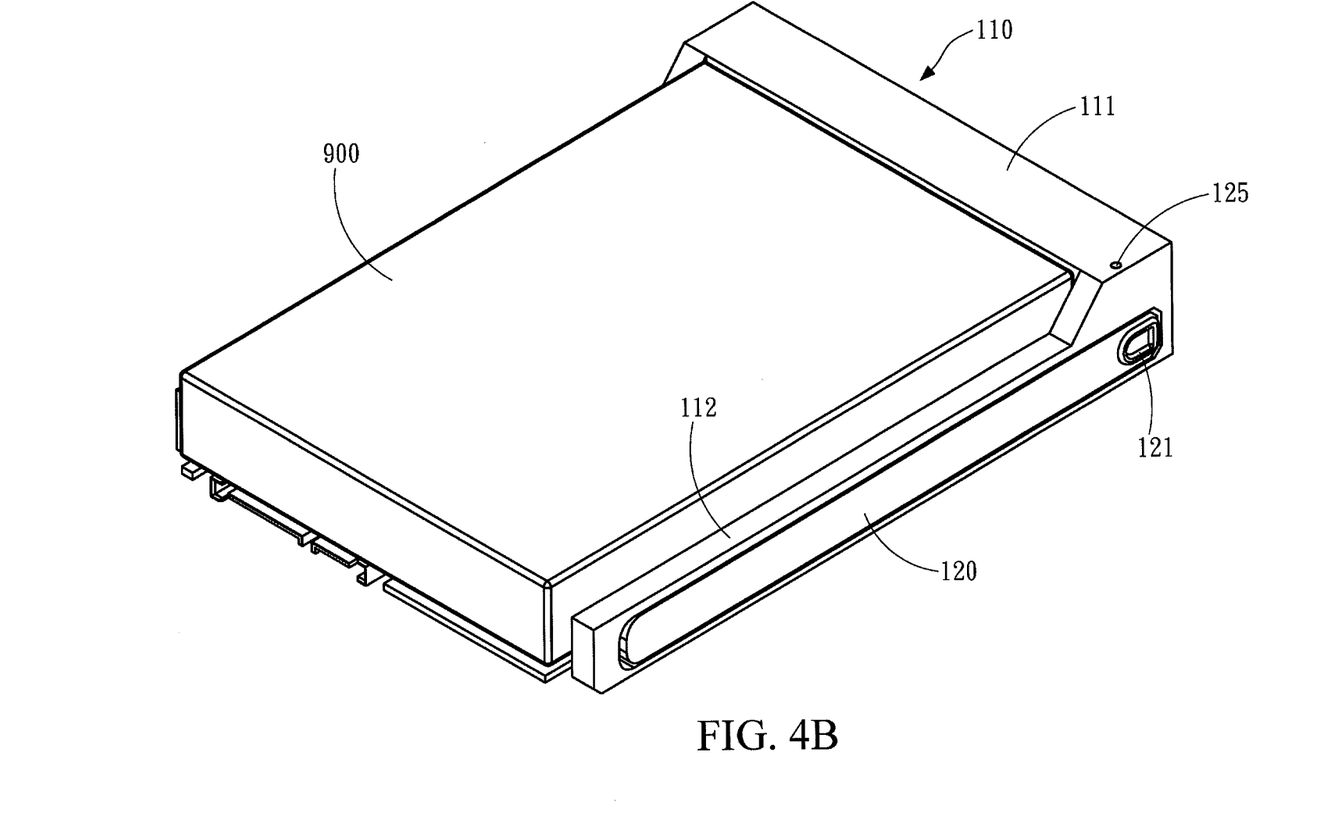
FIG. 4B is a perspective view of the first embodiment of the present invention, in which the fixing member is mounted to the sideboard.

Referring to FIGS. 4A and 4B, in which when the electronic device 900 is fixing at the electronic device bracket 100, the user firstly presses the pressing end 121, such that the pressing end 121 enters the sink area 116. At this time, the fixing member 120 rotates about the shaft 125; so that the fixing member 120 stacked on the sideboard 112 in parallel is separated from the sideboard 112. When the fixing member 120 and the sideboard 112 are separated, the fixing member 120 enables the elastic element 130 to generate elastic deformation, so as to generate an elastic force to cause the fixing member 120 to restore its original position and to be stacked on the sideboard 112 of the main frame 110. At this time, if the pressing end 121 is pressed continuously, the fixing member 120 and the sideboard 112 continuously remain separate. The user then places the electronic device 900 between the two sideboards 112 and aligns the screw holes or securing holes at two side surfaces of the electronic device 900 with the assembling holes 113 of the sideboard 112. After the electronic device 900 is placed, the pressing end 121 is released such that no force is applied on the pressing end 121. Under the elastic force of the elastic element 130, the fixing member 120 once again approaches the sideboard 112 with rotation about the shaft 125. When the fixing member 120 is stacked on the sideboard 112 again, the connecting members 122 on the fixing member 120 are inserted in the screw holes or securing holes of the electronic device 900 after passing through the assembling holes 113 and the elastic rings 114 at the same time, such that the electronic device 900 is fixed on the main frame 110. Due to the gap 124 between the semicircular column bodies 123 of each connecting member 122, each connecting member 122 can be compressed and deformed, so as to be securely fixed in the screw holes or securing holes. When the user intends to disassemble the electronic device 900, the user only needs to reverse the above operations, such that the connecting members 122 are separated from the screwing holes or securing holes of the electronic device 900, so as to disassemble the electronic device 900.

Figure 5:
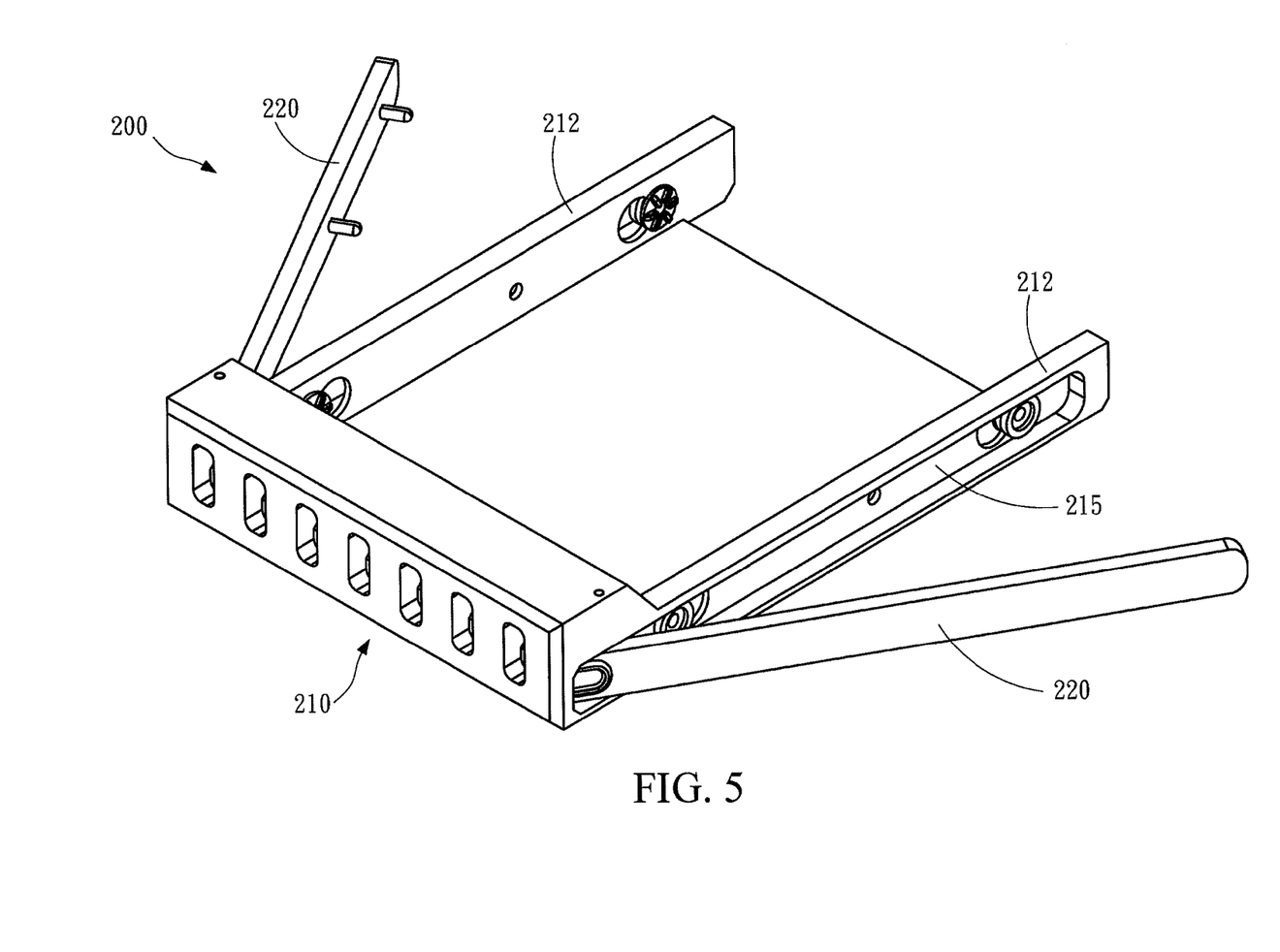
FIG. 5 is a perspective view of a second embodiment of the present invention.

FIG. 5 shows a bracket 200 for fixing an electronic device therein according to a second embodiment of the present invention. In the second embodiment, a rabbet 215 is formed on an outer side surface of each of two sideboards 212 of a main frame 210, and the bracket 200 has two fixing members 220 detachably mo the sideboards 212 respectively, so as to be fixed to two side surfaces of the electronic device 900 respectively, such that the electronic device 900 does not easily shake under an external force.

Figure 6:
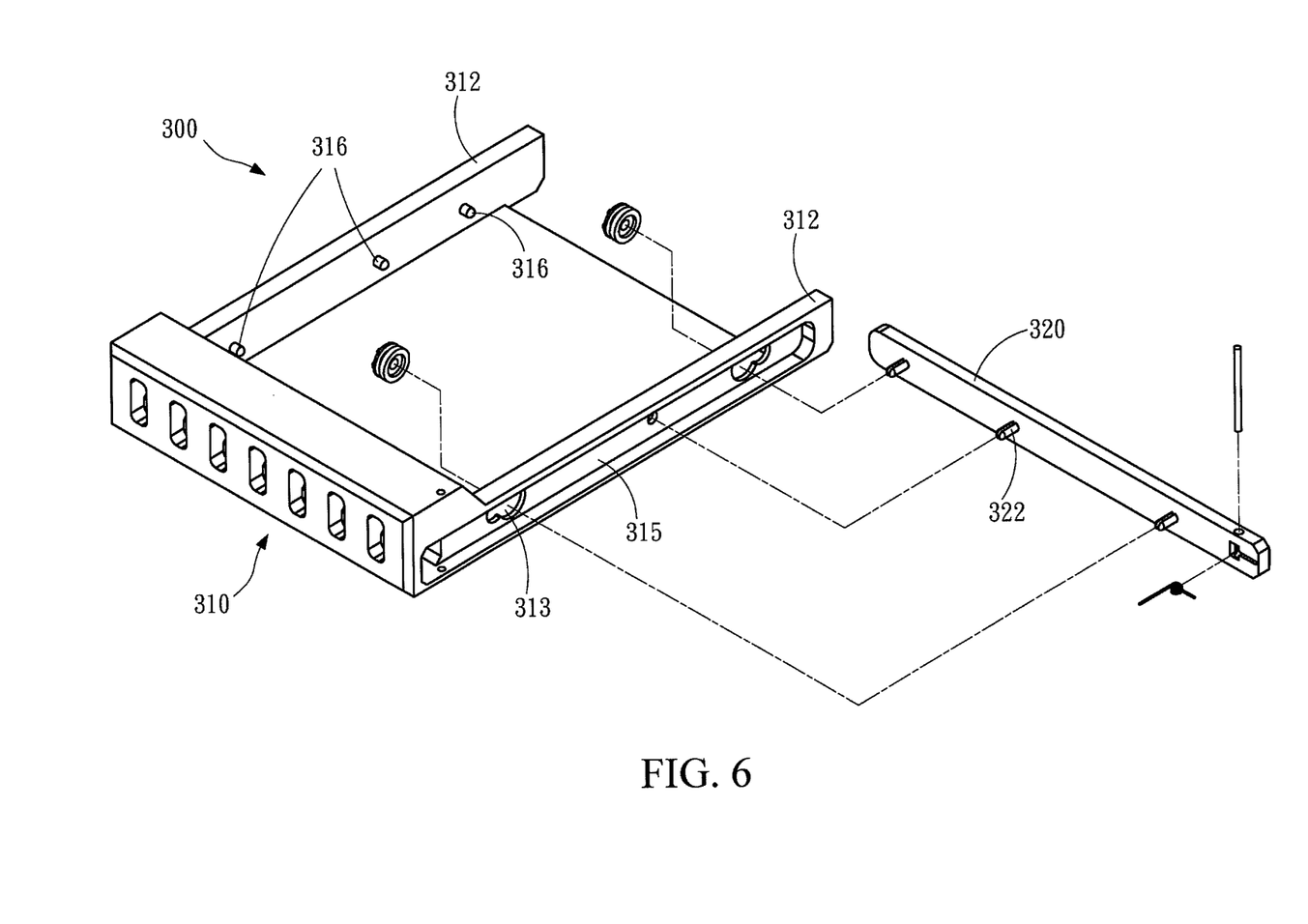
FIG. 6 is an exploded view of a third embodiment of the present invention.

FIG. 6 shows a bracket 300 for fixing an electronic device therein according to a third embodiment of the present invention. The electronic device bracket 300 includes a main frame 310 and a fixing member 320. The third embodiment is basically the same as the first embodiment. The only difference there-between is that a rabbet 315 is foamed on an outer side surface of one of two sideboards 312 for one fixing member 320 to be disposed therein. The sideboard 312 formed with the rabbet 315 has a plurality of assembling holes 313 arranged on the sideboard 312 at intervals and located on the rabbet 315. The other sideboard 312 may be configured into a sideboard type of various brackets in the prior art. FIG. 6 shows a sideboard type in the prior art, but the present invention is not limited to the type shown in FIG. 6. The other sideboard 312 has a plurality of securing members 316 disposed at an inner side surface of the sideboard 312, and relative positions among the securing members 316 match with the relative positions of the screw holes at the side surface of the hard disk. The electronic device 900 is first placed obliquely between the two sideboards 312, and the securing members 316 are inserted into the screw holes on one side surface of the electronic device 900 at first. Next, the fixing member 320 is disposed in the corresponding rabbet 315, so as to be stacked on the corresponding sideboard 312, and connecting members 322 are enabled to be inserted into the screw holes or securing holes at the other side surface of the electronic device 900, thereby fixing the electronic device 900 between the two sideboards 312.

Figure 7:
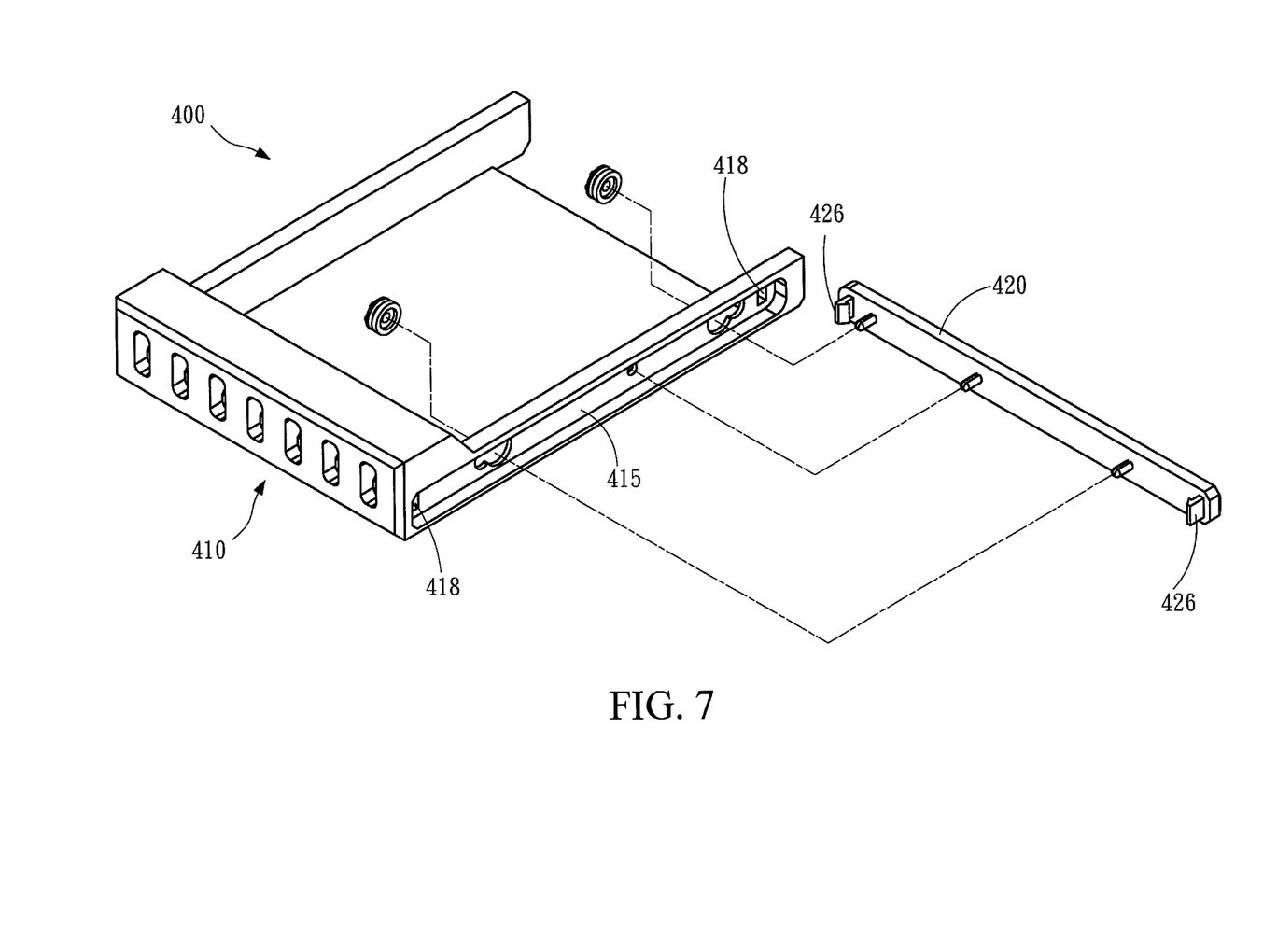
FIG. 7 is an exploded view of a fourth embodiment of the present invention.
Figure 8:
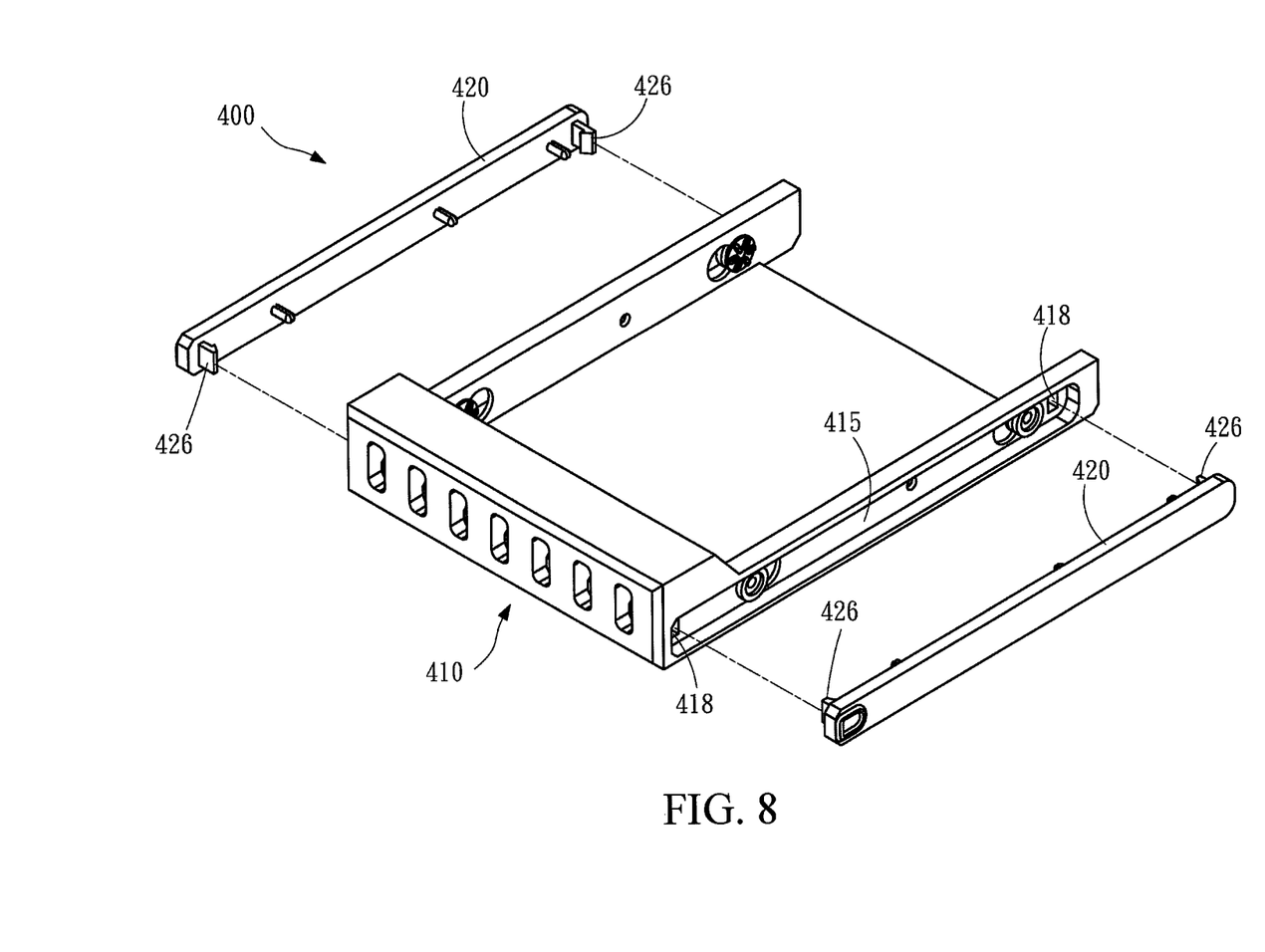
FIG. 8 is an exploded view of another varied example of the fourth embodiment of the present invention, including two fixing members to fix an object.

FIGS. 7 and 8 show a bracket 400 for fixing an electronic device therein according to a fourth embodiment of the present invention. The electronic device bracket 400 includes a main frame 410 and one or two fixing members 420. In this embodiment, latch holes 418 are disposed in a rabbet 415 and located at two ends of the rabbet 415 respectively. Latch members 426 corresponding to the latch holes 418 are disposed on the fixing member 420. Through the mutual locking effects by inserting the latch members 426 into the latch holes 418, the fixing member 420 is disposed within the rabbet 415 of the sideboard 412, thereby fixing the electronic device 900 on the main frame 410.

Figure 9:
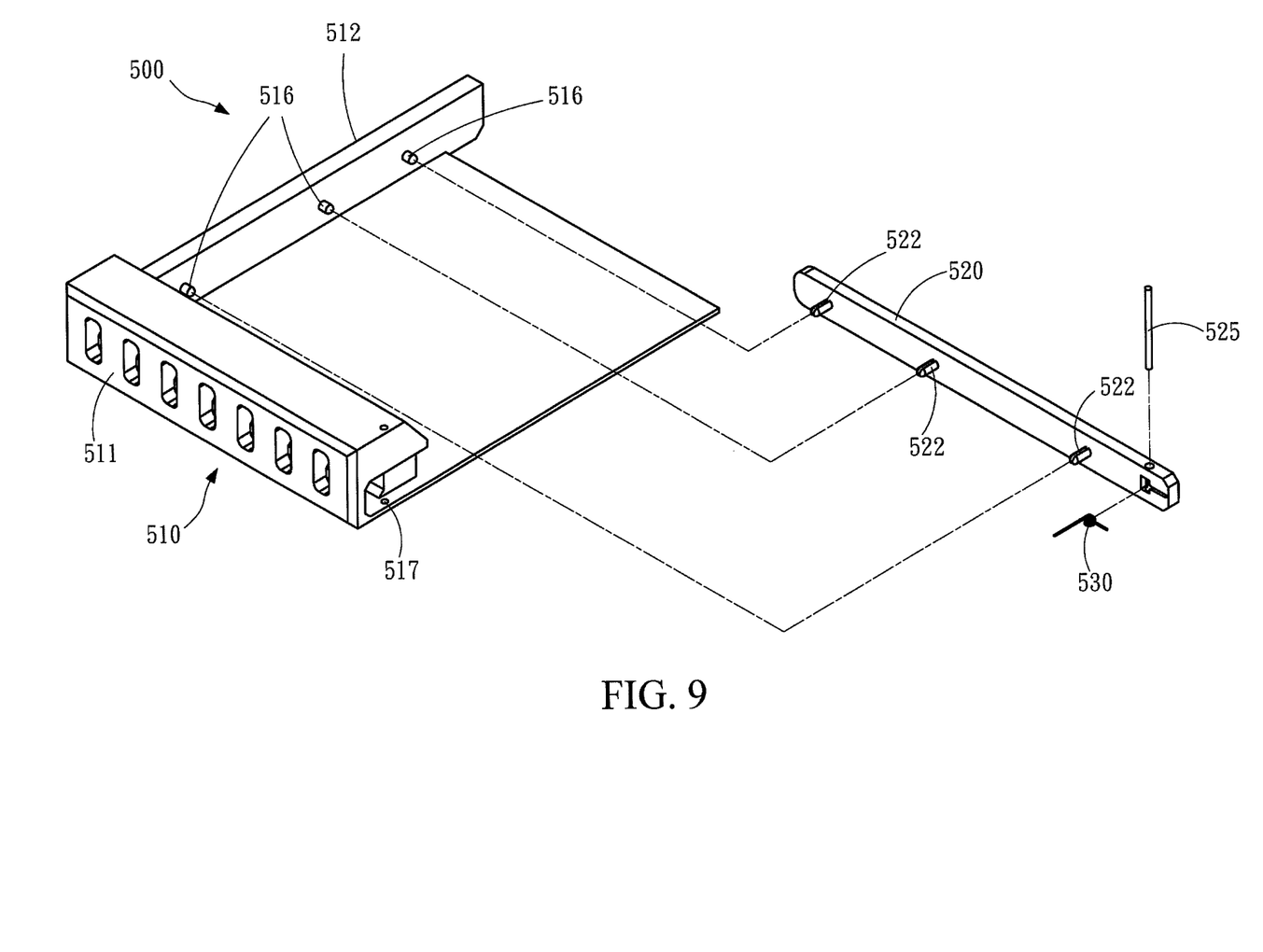
FIG. 9 is an exploded view of a fifth embodiment of the present invention.

FIG. 9 shows a bracket 500 for fixing an electronic device according to a fifth embodiment of the present invention. The electronic device bracket 500 includes a main frame 510 and a fixing member 520.

Referring to FIG. 9, the main frame 510 has a connecting portion 511 and a sideboard 512. The sideboard 512 is disposed at one end of the connecting portion 511. The sideboard 512 has a plurality of securing members 516 disposed at an inner side surface of the sideboard, and relative positions among the securing members 516 match with relative positions of the screw holes at the side surface of the hard disk.

Referring to FIG. 9, in which the fixing member 520 is pivoted to the other end of the connecting portion 511. A plurality of connecting members 522 is disposed at one side of the fixing member 520.

Referring to FIG. 9, a front edge portion of the fixing member 520 is pivoted to the connecting portion 511. Specifically, a shaft 525 is disposed at the front edge portion of the fixing member 520, and the connecting portion 511 has a pivot hole 517 corresponding to the shaft 525. The shaft 525 is inserted into the pivot hole 517, such that the fixing member 520 is pivoted to the connecting portion 511.

Referring to FIG. 9, the bracket 500 further includes an elastic element 530. One end of the elastic element 530 is connected to the fixing member 520 and the other end is connected to the connecting portion 511 of the main frame 510. The elastic element 530 is deformed when the fixing member 530 is separated from the sideboard 512, thereby generating an elastic force to have the fixing member 520 be stacked on the sideboard 512. The elastic element 530 may be a torsion spring or a compression spring. When the elastic element 530 is a torsion spring, the torsion spring is sleeved on the shaft 525 and two ends of the torsion spring are connected to the fixing member 520 and the connecting portion 511 of the main frame 510 respectively. When the elastic element 530 is a compression spring, two ends of the compression spring are connected to the fixing member 520 and the connecting portion 511 of the main frame 510 respectively. The compressed spring normally is compressed to generate an elastic force to push the front edge portion of the fixing member 520 outwards, so as to have the fixing member 520 to swing towards the sideboard 512.

When the electronic device 900 is fixed in the bracket 500, the user first presses the front edge of the fixing member 520, so that the fixing member 520 rotates about the shaft 525, so as to swing towards a direction away from the sideboard 512. Next, one side surface of the electronic device 900 is made to lean against the sideboard 512, and the securing members 516 are first inserted into screw holes or securing holes at one side surface of the electronic device 900.

When the fixing member 520 and the sideboard 512 are separated, the elastic element 530 is elastically deformed to provide an elastic force to have the fixing member 520 swing towards the sideboard 512. At this time, the user only needs to release the fixing member 520, and the elastic element 530 drives the fixing member to approach the other side surface of the electronic device 900 and enables the connecting members 522 of the fixing member 520 to be inserted into the screw holes or securing holes of the electronic device 900, thereby fixing the electronic device 900 on the main frame 510.

Figure 10:
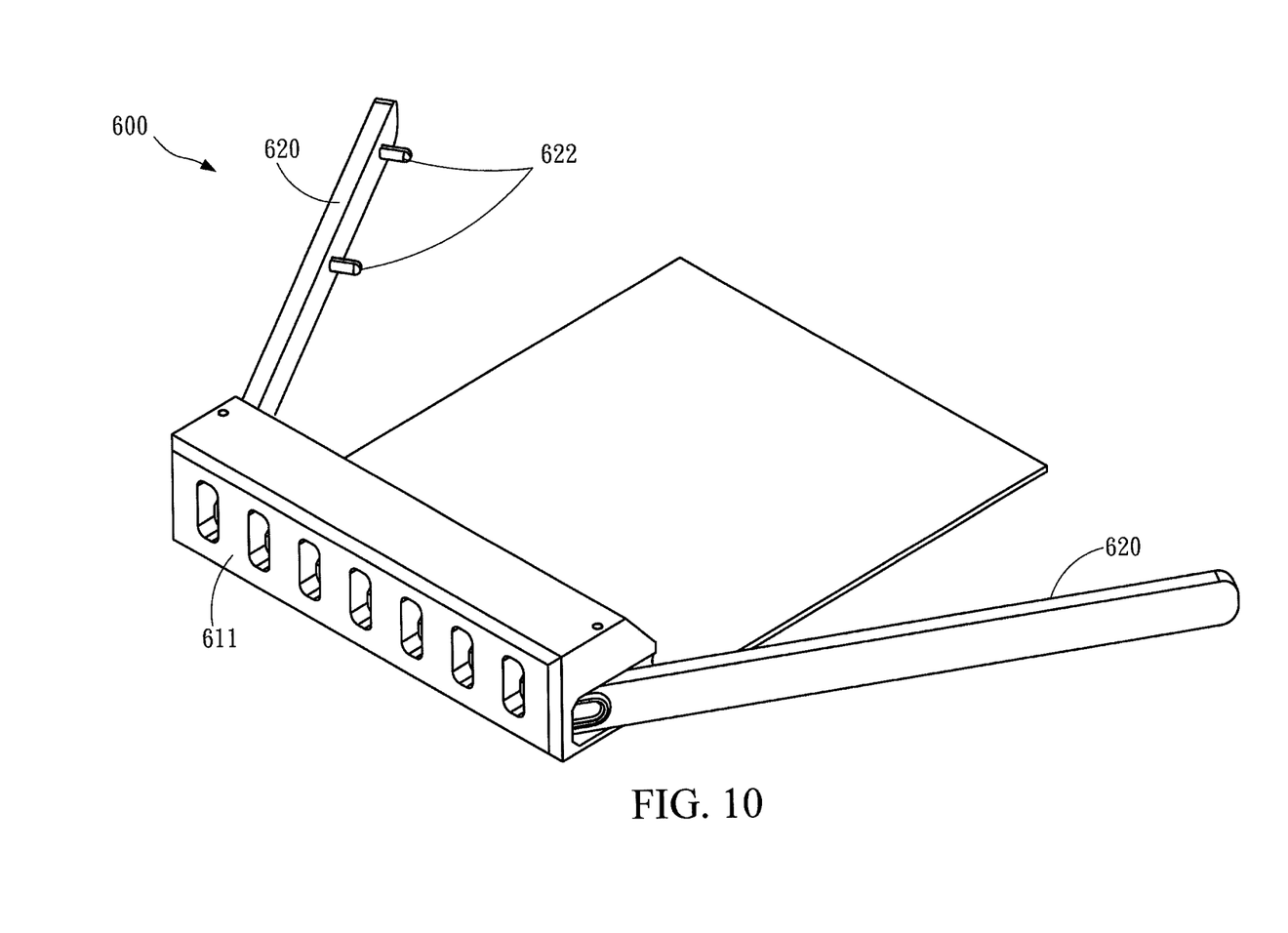
FIG. 10 is a perspective view of a sixth embodiment of the present invention.

FIG. 10 shows a bracket 600 for fixing an electronic device according to a sixth embodiment of the present invention. The electronic device bracket 600 includes a connecting portion 611 and two fixing members 620. The two fixing members 620 are pivoted to two ends of the connecting portion 611. The manner that the fixing members 620 are pivoted to the connecting portion 611 is the same as that in the fifth embodiment. The two fixing members 620 are respectively driven by an elastic element to swing in directions approaching each other, such that the two fixing members 620 are made to lean against two side surfaces of the electronic device 900 respectively and connecting members 622 thereof are inserted into screw holes or securing holes of the electronic device 900, thereby fixing the electronic device 900 between the two fixing members 620.

In the present invention, detachable or pivotal fixing members are fixed to outer side surfaces of the electronic device. The fixing members can be rapidly detached from the electronic device, such that the electronic device can be rapidly detached from the bracket. Through the present invention, the electronic device can be assembled and disassembled more conveniently, and no other tools are needed for assembly and disassembly, thereby saving time and energy.

While the present invention has been described by way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A bracket for fixing an electronic device therein, the bracket comprising:
 a body, having a connecting portion and two sideboards, wherein the two sideboards are respectively disposed at two ends of the connecting portion and in parallel with each other, a distance is kept between the two sideboards for accommodating the electronic device between the two sideboards, and one of the two sideboards has a plurality of assembling holes; and a fixing member, detachably mounted to the sideboard having the assembling holes, wherein a plurality of connecting members is disposed at one side of the fixing member for passing through the assembling holes respectively and being fixed on the electronic device to fix the electronic device;

wherein a rabbet is formed at an outer side surface of the sideboard having the assembling holes, for the fixing member to be stacked therein, and wherein a front edge portion of the fixing member is pivoted to the sideboard, a shaft is disposed at the front edge portion of the fixing member, a pivot hole is formed in the rabbet, and the shaft is inserted into the pivot hole to pivot the fixing member to the sideboard.

2. The bracket according to claim 1, wherein each of the assembling holes comprises an elastic ring embedded in the sideboard and surrounding each of the assembling holes.

3. The bracket as claimed in claim 2, wherein each elastic ring has a H-shaped sectional structure along a radial direction, a part of each elastic ring is located within the corresponding assembling hole and surrounds the assembling hole, and the remaining part of the elastic ring is located at two sides of the sideboard respectively.

4. The bracket as claimed in claim 1, further comprising: a torsion spring, sleeved on the shaft, wherein two ends of the torsion spring are connected to the fixing member and the sideboard respectively to generate an elastic force to have the fixing member be stacked on the sideboard.

5. The bracket as claimed in claim 1, wherein a sink area is formed at one end of the rabbet, one end of the fixing member has a pressing end stacked over the sink area, and the pressing end enters the sink area with rotation of the fixing member.

6. The bracket as claimed in claim 5, further comprising: a compression spring, disposed in the sink area, wherein two ends of the spring are connected to the pressing end of the fixing member and the sideboard respectively, and the compression spring is compressed to generate an elastic force to push the pressing end outwards to have the fixing member be stacked on the sideboard.

7. The bracket as claimed in claim 1, further comprising: an elastic element, wherein one end of the elastic element is connected to the fixing member, and the other end of the elastic member is connected to the sideboard to generate an elastic force for having the fixing member be stacked on the sideboard.

8. The bracket as claimed in claim 1, further comprising: a plurality of securing members disposed at the sideboard equipped without assembling holes, and used for being secured on the electronic device.

9. A bracket for fixing an electronic device therein, the bracket comprising:

a main frame, having a connecting portion and a sideboard, wherein the sideboard is disposed at one end of the connecting portion; and a fixing member, detachably mounted to the sideboard, a front edge of the fixing member is pivoted to the sideboard, wherein a plurality of connecting members is disposed at one side of the fixing member for fixing the electronic device wherein a rabbet is formed at an outer side surface of the sideboard having the assembling holes, for the fixing member to be stacked therein, and wherein, a shaft is disposed at the front edge portion of the fixing member, a pivot hole is formed in the rabbet, and the shaft is inserted into the pivot hole to pivot the fixing member to the sideboard.

10. The bracket as claimed in claim 9, further comprising: a torsion spring, sleeved on the shaft, wherein two ends of the torsion spring are connected to the fixing member and the connecting portion respectively to generate an elastic force to have the fixing member swing towards the sideboard.

11. The bracket as claimed in claim 9, further comprising: a compression spring, wherein two ends of the compression spring are connected to the fixing member and the connecting portion respectively, and the compression spring is compressed to generate an elastic force to push the fixing member outwards to have the fixing member swings towards the sideboard.

12. The bracket as claimed in claim 9, further comprising: a plurality of securing members disposed at the sideboard, and used for being secured on the electronic device.

13. A bracket for fixing an electronic device therein, the bracket comprising:

a body, having a connecting portion and two sideboards, wherein the two sideboards are respectively disposed at two ends of the connecting portion and in parallel with each other, a distance is kept between the two sideboards for accommodating the electronic device between the two sideboards, and one of the two sideboards has a plurality of assembling holes; and a fixing member, detachably mounted to the sideboard having the assembling holes, wherein a plurality of connecting members is disposed at one side of the fixing member for passing through the assembling holes respectively and being fixed on the electronic device to fix the electronic device;

wherein a rabbet is formed at an outer side surface of the sideboard having the assembling holes, for the fixing member to be stacked therein; a sink area is formed at one end of the rabbet, one end of the fixing member has a pressing end stacked over the sink area, and the pressing end enters the sink area with rotation of the fixing member; a compression spring is disposed in the sink area, wherein two ends of the spring are connected to the pressing end of the fixing member and the sideboard respectively, and the compression spring is compressed to generate an elastic force to push the pressing end outwards to have the fixing member be stacked on the sideboard.

14. The bracket according to claim 13, wherein each of the assembling holes comprises an elastic ring embedded in the sideboard and surrounding each of the assembling holes.

15. The bracket as claimed in claim 14, wherein each elastic ring has a H-shaped sectional structure along a radial direction, a part of each elastic ring is located within the corresponding assembling hole and surrounds the assembling hole, and the remaining part of the elastic ring is located at two sides of the sideboard respectively.

16. The bracket as claimed in claim 13, further comprising: a plurality of securing members disposed at the sideboard equipped without assembling holes, and used for being secured on the electronic device.

* * * * *